United States Patent
Nejah et al.

(10) Patent No.: US 8,370,605 B2
(45) Date of Patent: Feb. 5, 2013

(54) COMPUTER ARCHITECTURE FOR A MOBILE COMMUNICATION PLATFORM

(75) Inventors: Allen Nejah, San Jose, CA (US); Gholam Reza Golshan, Los Gatos, CA (US); George W. Harvey, Stanford, CA (US)

(73) Assignee: Sunman Engineering, Inc., San Jose, CA (US)

( * ) Notice: Subject to any disclaimer, the term of this patent is extended or adjusted under 35 U.S.C. 154(b) by 649 days.

(21) Appl. No.: 12/616,146

(22) Filed: Nov. 11, 2009

(65) Prior Publication Data
US 2011/0113219 A1    May 12, 2011

(51) Int. Cl.
*G06F 15/76* (2006.01)

(52) U.S. Cl. ............................. 712/30; 712/16; 345/502

(58) Field of Classification Search .................... 712/30, 712/16
See application file for complete search history.

(56) References Cited

U.S. PATENT DOCUMENTS

| | | | |
|---|---|---|---|
| 5,271,013 A * | 12/1993 | Gleeson ........................ 714/10 |
| 6,789,154 B1 * | 9/2004 | Lee et al. ...................... 710/315 |
| 6,985,150 B2 * | 1/2006 | Deering ........................ 345/506 |
| 7,444,551 B1 * | 10/2008 | Johnson et al. ................ 714/43 |
| 7,623,131 B1 * | 11/2009 | Johnson ........................ 345/502 |
| 8,131,975 B1 * | 3/2012 | Cismas et al. ................. 712/11 |
| 2007/0146373 A1 * | 6/2007 | Cool et al. .................... 345/502 |
| 2007/0220246 A1 * | 9/2007 | Powell et al. ................... 713/2 |
| 2008/0030509 A1 * | 2/2008 | Conroy et al. ................ 345/502 |
| 2008/0270753 A1 * | 10/2008 | Achiwa et al. ................. 712/30 |
| 2010/0141664 A1 * | 6/2010 | Rawson et al. ............... 345/502 |
| 2011/0035575 A1 * | 2/2011 | Kwon ............................. 713/2 |
| 2011/0084973 A1 * | 4/2011 | Masood ....................... 345/506 |

* cited by examiner

*Primary Examiner* — Idriss N Alrobaye
(74) *Attorney, Agent, or Firm* — Patent Law Group LLP; David C. Hsia

(57) ABSTRACT

A system includes first and second processors, first and second graphics processing units (GPUs), one or more peripheral devices, a switch matrix, and processor-readable memory. The switch matrix comprises programmable data paths between the processors, the GPUs, and the peripheral devices. Software encoded in the process-readable memory includes a first operating system (OS) executed by the first processor, a second OS executed by the second processor, a matrix scheduling engine, and a media interface switch (MIS) engine. The first OS boots faster than the second OS. The matrix scheduling engine runs on both OSs and configures the data paths in the switch matrix to couple the processors and the GPUs, and to couple the processors and the peripheral devices. The MIS engine runs on the operating systems, detects presence of the peripheral devices, and configures the data paths in the switch matrix to couple the processors and the peripheral devices.

21 Claims, 7 Drawing Sheets

COMPUTER ARCHITECTURE FOR A MOBILE COMMUNICATION PLATFORM

FIELD OF INVENTION

This invention relates to a computer architecture for a mobile communication platform, and more specifically to a computer architecture for a vehicle infotainment platform.

DESCRIPTION OF RELATED ART

Mobile computers, such as laptops and netbooks, offer portability so they can be used in many places and situations. Mobile computing has expanded to the automotive industries, with companies offering in-dash computers that replace the traditional radio equipment. Thus, what is needed is a computer architecture suitable for a vehicle infotainment platform. Furthermore, such a computer architecture has application outside of the automotive industry in the general mobile computing industry.

BRIEF DESCRIPTION OF THE DRAWINGS

In the drawings.

Use of the same reference numbers in different figures indicates similar or identical elements.

DETAILED DESCRIPTION

In one or more embodiments of the present disclosure, a computer architecture for a mobile communication platform is provided. The mobile communication platform includes two processors, two graphics processing units (GPUs), peripheral devices, and a switch matrix that directly connects or indirectly couples the processors, the GPUs, and the peripheral devices. The two processors execute different operating systems and partition tasks in order to optimize performance and reliability. A fast boot operating system (OS) enables one processor to implement the more critical system functions while the other OS enables the other processor to implement other system functions with a wide range of applications and services that may be provided by third parties. The switch matrix provides full flexibility for interchanging data between the processors, the GPUs, and the peripheral devices. The two GPUs provide simultaneous and independent video streams from any of the processors.

Figure 1:
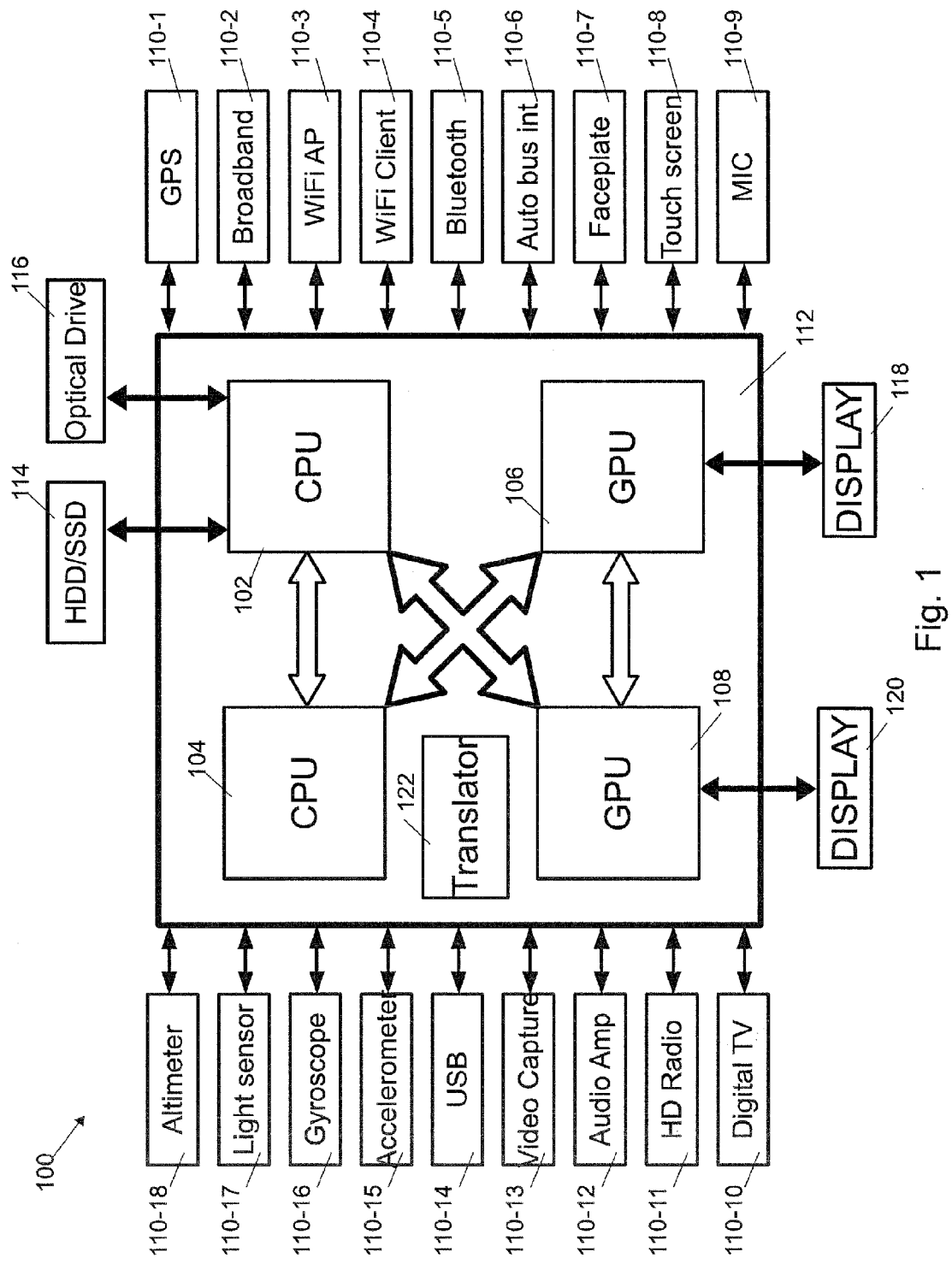
FIG. 1 is a block diagram of a hardware architecture for a computer system in one or more embodiments of the present disclosure.

FIG. 1 is a block diagram of a hardware architecture for a computer system 100 in one or more embodiments of the present disclosure. System 100 is a mobile communication platform, such as a vehicle infotainment platform that replaces the traditional radio equipment in a car, motorcycle, boat, or any other vehicle. System 100 may also implement other devices, including desktop and laptop computers.

System 100 includes a first processor 102, a second processor 104, a first GPU 106, a second GPU 108, one or more of peripheral devices 110-1 to 110-18 (collectively "peripheral devices 110"), a switch matrix 112, a hard disk drive (HDD) or a solid state drive (SSD) 114, an optical disk drive 116 (e.g., CD, DVD, and BD compatible), a front display 118, and one or more optional rear displays 120. Each peripheral device may be associated or assigned to one of processors 102 and 104.

Processors 102 and 104 have different instruction set architectures, with first processor 102 being simpler and more robust than second processor 104. First processor 102 may be an ARM processor such as the Marvell Sheeva processor, and second processor 104 may be an x86 processor such as the Intel Atom. Alternatively processors 102 and 104 may have the same instruction set architecture. Although not shown, processors 102 and 104 are connected to random access memories to hold programming codes and data.

Peripheral devices 110 includes a GPS receiver 110-1, one or more broadband transceivers 110-2, a WiFi access point (AP) transceiver 110-3, a WiFi client transceiver 110-4, a Bluetooth transceiver 110-5, an automotive bus interface 110-6, a faceplate 110-7 with buttons, a touch screen 110-8, one or more microphones 110-9, a digital TV receiver 110-10, a digital radio receiver 110-11, an audio power amplifier 110-12 for speakers, one or more video cameras 110-13, a USB or iPod interface 110-14, an accelerometer 110-15, a gyroscope 110-16, a light sensor 110-17, and an altimeter 110-18. Broadband transceivers 110-2 may be one or more of a 3G transceiver, a 4G transceiver, a WiMAX (worldwide interoperability for microwave access) transceiver, and a LTE (long term evolution) transceiver. Once system 100 gains access to the Internet, it may use WiFi AP transceiver 110-3 to create a hotspot and provide the same Internet access to other local WiFi devices. Automotive bus interface 110-6 may be one or more of a controller area network (CAN) interface, a local interconnect network (LIN) interface, and a media oriented systems transport (MOST) interface. Cameras 110-13 may be mounted inside and all around the vehicle. USB/iPod interface 110-14 may include a USB switch for connecting to multiple USB devices to either first processor 102 or second processor 104.

Switch matrix 112 includes programmable data paths that are configured to communicate data between processors 102 and 104, between the processors and GPUs 106 and 108, and between the processors and peripheral devices 110. The data paths may be reconfigured on the fly for load balancing and redundancy. Switch matrix 112 also includes a translator 122 that transforms or formats the data to be compatible between communicating components. For example, translator 122 may change analog video format from cameras 110-13 to a digital video format compatible with GPUs 106 and 108 (e.g., from analog to digital composite video signals). Translator 122 may also change one digital video signal format to another digital video format.

HDD/SSD 114 and optical disk drive 116 are coupled to first processor 102. Front display 118 is coupled to first GPU 106 and rear displays 120 are coupled to second GPU 108.

Figure 2:
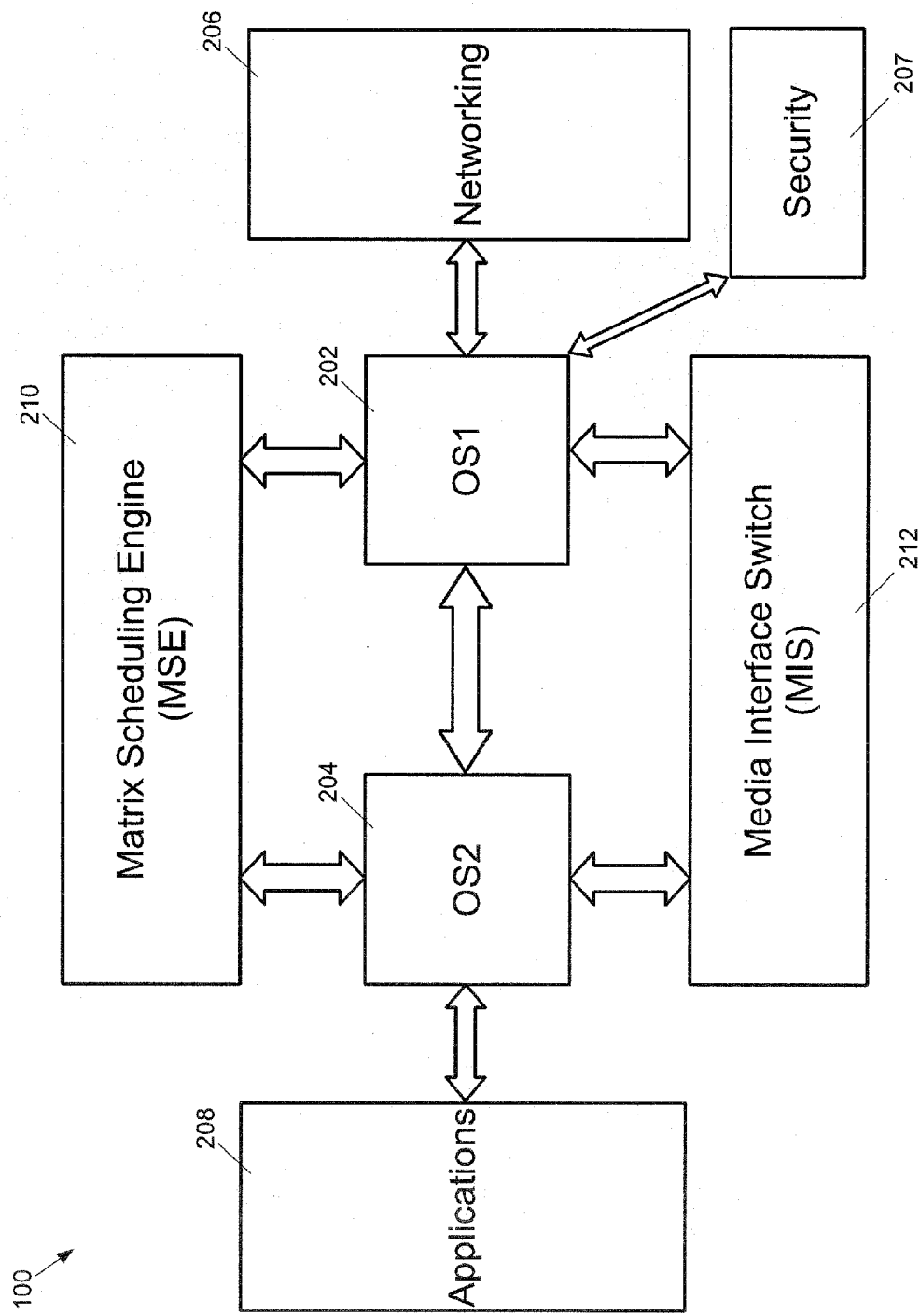
FIG. 2 is a block diagram of a software architecture for the system of FIG. 1 in one or more embodiments of the present disclosure.

FIG. 2 is a block diagram of a software architecture for system 100 in one or more embodiments of the present disclosure. System 100 includes a first OS 202, a second OS 204, networking software 206, a security engine 207, application software 208, a matrix scheduling engine 210, and a media interface switch (MIS) engine 212.

First OS 202 is executed by first processor 102 while second OS 204 is executed by second processor 104. Operating systems 202 and 204 are different types, with first OS 202 being more stable and reliable than second OS 204. First OS 202 has a faster boot time than second OS 204. First OS 202 may be Moblin, Fedora, Ubuntu, or Android, and second OS 204 may be Windows or Snow Leopard. Alternatively operating systems 202 and 204 may be the same type.

Software in system 100 is generally partitioned between networking software 206 and application software 208. Networking software 206 and security engine 207 primarily run on first OS 202 executed by first processor 102, and application software 208 primarily run on second OS 204 executed by second processor 104. For load balancing or redundancy, secondary or backup versions of some or all of networking software 206 and security engine 207 may also run on second OS 204 executed by second processor 104. Conversely, secondary or backup versions of some or all of application software 208 may also run on first OS 202 executed by first processor 102. The secondary or backup software may offer all or limited functionalities of the primary software.

Networking software 206 include drivers for GPS receiver 110-1, broadband transceivers 110-2, WiFi AP transceiver 110-3, WiFi client transceiver 110-4, Bluetooth transceiver 110-5, automotive bus interface 110-6, and wired Ethernet. Networking software 206 also include a protocol stack for communicating data with external sources (e.g., web and mail servers) and internal components (e.g., between processors 102 and 104).

Application software 208 include a user interface (UI) application, a browser application, an email application, a mutimedia player, a vehicle diagnostic application, a mobile phone application, local base service applications, a TV application, a radio application, a voice over Internet protocol (VoIP) application, a rearview camera application, a lane departure warning application, a drowsiness warning application, a blackbox application, and a voice command application. The UI application creates the graphical user interface for system 100, such as the menus, buttons, and graphics for accessing the various system functions. Using broadband transceiver 110-2 or WiFi client transceiver 110-4, the browser and the email applications respectively provide user access to the Internet and email service. The mutimedia player plays back media stored on HDD/SSD 114, optical disk drive 116, and the Internet. Using USB/iPod interface 110-14, the mutimedia application also plays back media stored on USB devices and iPods. Using automotive bus interface 110-6, the vehicle diagnostic application provides user access to the on-board diagnostics (OBD) system of the vehicle for real time engine management and diagnostics. Using broadband transceivers 110-2, the mobile phone application allows the user to make wireless calls. Using GPS receiver 110-1, the location based service applications may provide GPS navigation (e.g., directions, real time traffic with rerouting, weather, directory assistance, and points of interest), fleet management, social networking, and advertisement. Accelerometer 110-15, gyroscope 110-16, and altimeter 110-18 may be used by the location based service applications for dead reckoning when GPS signals are not available.

Using digital TV receiver 110-10, the TV application provides one or more of terrestrial and satellite TVs to the user. Using digital radio receiver 110-11, the radio application provides one or more of terrestrial and satellite radios to the user. The VoIP application allows the user to make VoIP calls over the Internet. Using one or more cameras 110-13 mounted on the rear of the vehicle, the rearview camera application allows the user to see what is behind the vehicle on display 118 to aid in backing up the vehicle. Using image processing of inputs from one or more cameras 110-13 mounted along the front and the sides of the vehicle, the lane departure warning application warns the user when the vehicle begins to drift out of its lane without signaling. Using image processing of inputs from one or more cameras 110-13 mounted inside the vehicle, the drowsiness warning application warns when the user appears drowsy or inattentive. Using GPS receiver 110-1, automotive bus interface 110-6, microphones 110-9, cameras 110-13, accelerometer 110-15, gyroscope 110-16, and altimeter 110-18, the blackbox application records travel parameters, voice, and video for use in accident investigations. With microphones 110-9, the blackbox application may also perform beamforming to distinguish between different people speaking within the vehicle. Using microphones 110-9, the voice command application allows the user to speak commands to system 100 instead of pressing buttons on faceplate 110-7 and touch screen 110-8. The voice command application may also perform beamforming to distinguish between different people speaking within the vehicle (e.g., performing only commands from the driver or distinct commands for different people).

MIS engine 212 is an application executed on both operating systems 202 and 204. A primary version of MIS engine 212 runs on first OS 202 and a backup version of the MIS engine on second OS 204 takes over when the primary version fails. MIS engine 212 detects the presence of peripheral devices 110 at power up or initialization, and any newly plugged in peripheral devices thereafter. MIS engine 212 configures the data paths in switch matrix 112 to couple processors 102 and 104 and peripheral devices 110. MIS engine 212 also informs matrix scheduling engine 210 of peripheral devices 110 and the configured data paths. The two versions of MIS engine 212 communicate with each other the device ID of detected peripheral devices 110 to remain in synchronization.

Matrix scheduling engine 210 is an application executed on both operating systems 202 and 204. Different versions of matrix scheduling engine 210 run on operating systems 202 and 204 and they work in conjunction to reconfigure the data paths in switch matrix 112 to couple processors 102 and 104 to GPUs 106 and 108. Matrix scheduling engine 210 may reconfigure the data paths in switch matrix 112 between processors 102 and 104 and peripheral devices 110 for load balancing and redundancy. The two versions of matrix scheduling engine 210 communicate with each other the configuration of the data paths to remain in synchronization.

Figure 3:
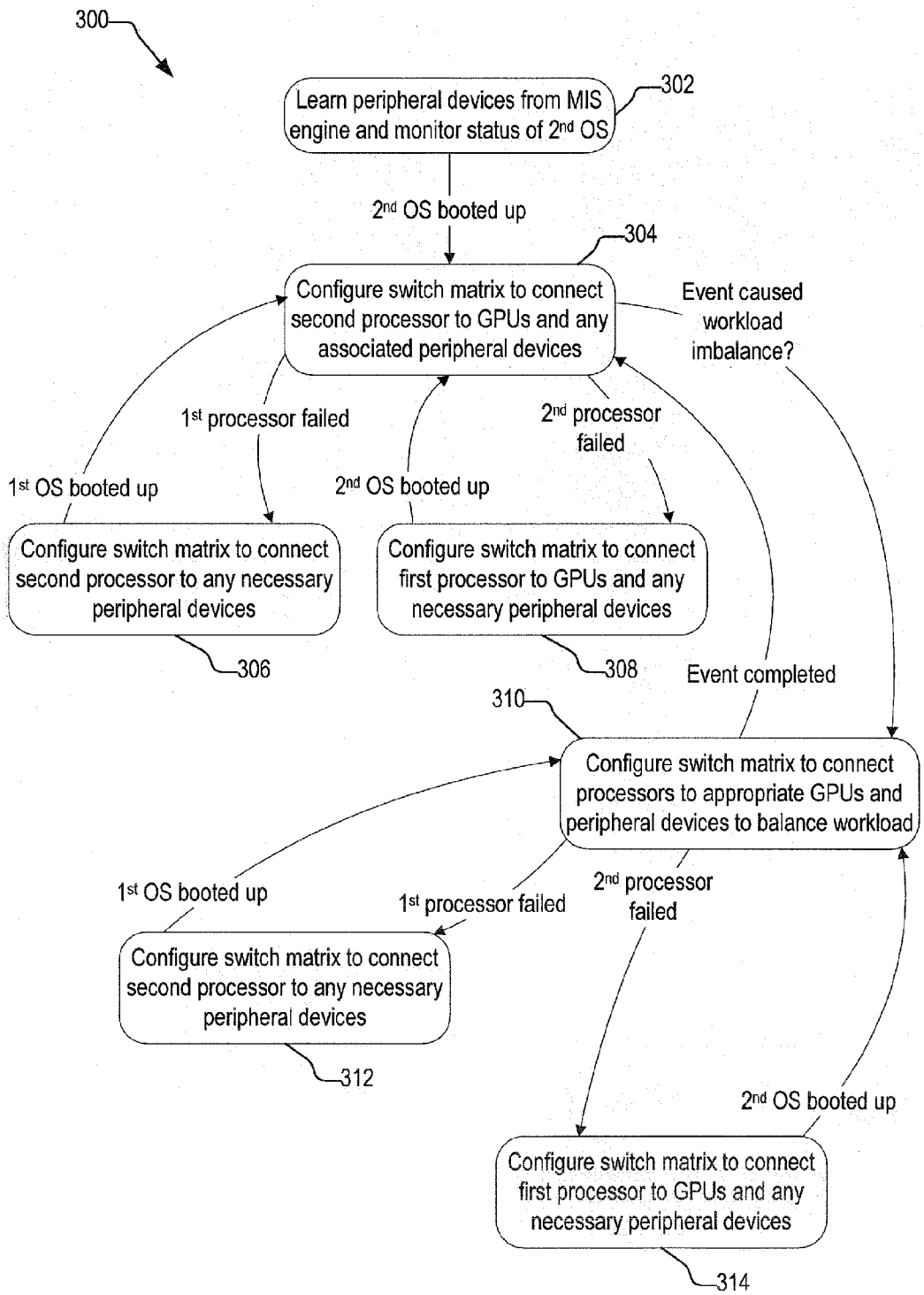
FIG. 3 is a state diagram of a matrix scheduling engine of FIG. 2 in one or more embodiments of the present disclosure.

FIG. 3 is a state diagram 300 of matrix scheduling engine 210 in one or more embodiments of the present disclosure. State diagram 300 includes states 302, 304, 306, 308, 310, 312, and 314.

Whenever system 100 powers up or initializes, switch matrix 112 connects GPUs 106 and 108 and peripheral devices 110 to first processor 102 by default. As first OS 202 boots faster than second OS 204, first processor 102 is able to generate a splash screen and runs some backup applications so the user may access some system functions immediately after power up or initialization. This provides an instant on experience similar to traditional radio equipment. The backup applications may include the backup versions of the UI application, the mutimedia player, the radio application, the location based service application (e.g., GPS navigation), and the backup camera application.

In initial state 302 when system 100 powers up or initializes, matrix scheduling engine 210 on first OS 202 of processor 102 learns of peripheral devices 110 from MIS engine 212. Matrix scheduling engine 210 also monitors the status of second OS 204. When matrix scheduling engine 210 detects that second OS 204 has booted up and application software 208 are ready, state 302 transitions to state 304.

In state 304, matrix scheduling engine 210 on second OS 204 of second processor 104 configures the data paths in switch matrix 112 to connect the second processor to GPUs 106 and 108. At this point, second processor 104 takes control of GPUs 106 and 108 from first processor 102 and provides all system functions to the user. The transition of GPUs 106 and 108 from first processor 102 to second processor 104 may be completely transparent to the user as the processors can generate substantially the same graphical information. Matrix scheduling engine 210 also configures the data paths in switch matrix 112 to connect any peripheral devices 110 associated with second processor 104 to the second processor. At this point, second processor 104 takes control of these peripheral devices 110 from first processor 102.

Matrix scheduling engine 210 on operating systems 202 and 204 also monitors the status of the processors, and for any event that would cause a work imbalance between the processors. When matrix scheduling engine 210 on second OS 204 detects first processor 102 is failing or has failed, state 304 transitions to state 306. When matrix scheduling engine 210 on first OS 202 detects second processor 104 is failing or has failed, state 304 transitions to state 308. When matrix scheduling engine 210 on OS 202 or 204 detects an event that would cause a work imbalance between processors 102 and 104, state 304 transitions to state 310.

In state 306, matrix scheduling engine 210 on second OS 204 configures the data paths in switch matrix 112 to connect the second processor to some or all of the peripheral devices 110 previously connected to first processor 102, and resets the first processor to bring it back online. At this point, second processor 104 runs the backup drivers for these peripheral devices 110, takes control of these peripheral devices, and continues to provide the system functions to the user in limited or full capacity. For example, second processor 104 may run the backup drivers for GPS transceiver 110-1, broadband transceivers 110-2, WiFi AP transceiver 110-3, WiFi client transceiver 110-4, and Bluetooth transceiver 110-5.

Matrix scheduling engine 210 on second OS 204 also monitors the status of first processor 102. When matrix scheduling engine 210 determines first OS 202 has booted up, state 306 transitions back to state 304 and restores the previous data paths in switch matrix 112 between processors 102 and 104 and peripheral devices 110.

In state 308, matrix scheduling engine 210 on first OS 202 configures the data paths in switch matrix 112 to connect first processor 102 to GPUs 106 and 108 and some or all of the peripheral devices previously connected to second processor 104, and resets the second processor to bring it back online. At this point, first processor 102 runs the backup applications and continues to provide the system functions to the user in a limited or full capacity. The backup applications may include the backup versions of the multimedia player, the radio application, the location based service application (e.g., GPS navigation), and the backup camera application.

Matrix scheduling engine 210 on first OS 202 also monitors the status of second processor 104. When matrix scheduling engine 210 determines second OS 204 has booted up, state 308 transitions back to state 304 and restores the previous data paths in switch matrix 112 between processors 102 and 104, GPUs 106 and 108, and peripheral devices 110.

State 304 transitions to state 310 when matrix scheduling engine 210 on first OS 202 or second OS 204 determines that an event would cause a workload imbalance between the first and the second processors. In one example, a user may wish to simultaneously playback a first movie on front display 118 and a second movie on rear displays 120. The primary multimedia player runs on second processor 104. When second processor 104 is already burdened with the voice command application, the VOIP application, and the web browser, it becomes desirable for first processor 102 to run the backup multimedia player to process one of the movies for display.

In state 310, matrix scheduling engine 210 on first OS 202 configures the data paths in switch matrix 112 to connect processors 102 and 104 to the necessary devices (GPUs and peripheral devices) to balance the workloads between them. Continuing the example from above, matrix scheduling engine 210 may configure the data paths in switch matrix 112 to connect first processor 102 to second GPU 108, and to connect second processor 104 to first GPU 106. This allows first processor 102 to run the backup multimedia player to display one movie on rear displays 120, and second processor 104 to run the primary multimedia player to display the other movie on front display 118.

Matrix scheduling engine 210 on operating systems 202 and 204 also monitors the status of the first and the second processors. When matrix scheduling engine 210 on second OS 204 detects first processor 102 is failing or has failed, state 310 transitions to state 312. When matrix scheduling engine 210 on first OS 202 detects second processor 104 is failing or has failed, state 310 transitions to state 314.

Matrix scheduling engine 210 that originally determined an event would cause a workload balance between processors 102 and 104 also monitors for the completion of that event. When matrix scheduling engine 210 detects that event has completed, state 310 transitions back to state 304 and restores the previous data paths in switch matrix 112 between processors 102 and 104, GPUs 106 and 108, and peripheral devices 110.

State 312 is similar to state 306. In state 312, matrix scheduling engine 210 on second OS 204 configures the data paths in switch matrix 112 to connect second processor 104 to some or all of the devices (GPUs and peripheral devices) previously connected to first processor 102, and resets the first processor to bring it back online. At this point, second processor 104 runs the backup drivers for these devices, takes control of these devices, and continues to provide the system functions to the user in limited or full capacity.

Matrix scheduling engine 210 on second OS 204 also monitors the status of first processor 102. When matrix scheduling engine 210 determines first OS 202 has booted up, state 312 transitions back to state 310 and restores the previous data paths in switch matrix 112 between processors 102 and 104, GPUs 106 and 108, and peripheral devices 110.

State 312 is similar to state 308. In state 312, matrix scheduling engine 210 on first OS 202 configures the data paths in switch matrix 112 to connect first processor 102 to some or all of the devices (GPUs and peripheral devices) previously connected to second processor 104, and resets the second processor to bring it back online. At this point, first processor 102 runs the backup drivers for these devices, takes control of these devices, and continues to provide the system functions to the user in limited or full capacity. The transition of GPUs 106 and 108 from second processor 104 to first processor 102 may be completely transparent to the user as the processors can generate substantially the same graphical information.

Matrix scheduling engine 210 on first OS 202 also monitors the status of second processor 104. When matrix scheduling engine 210 determines second OS 204 has booted up, state 314 transitions back to state 310 and restores the previous data paths in switch matrix 112 between processors 102 and 104, GPUs 106 and 108, and peripheral devices 110.

Figure 4:
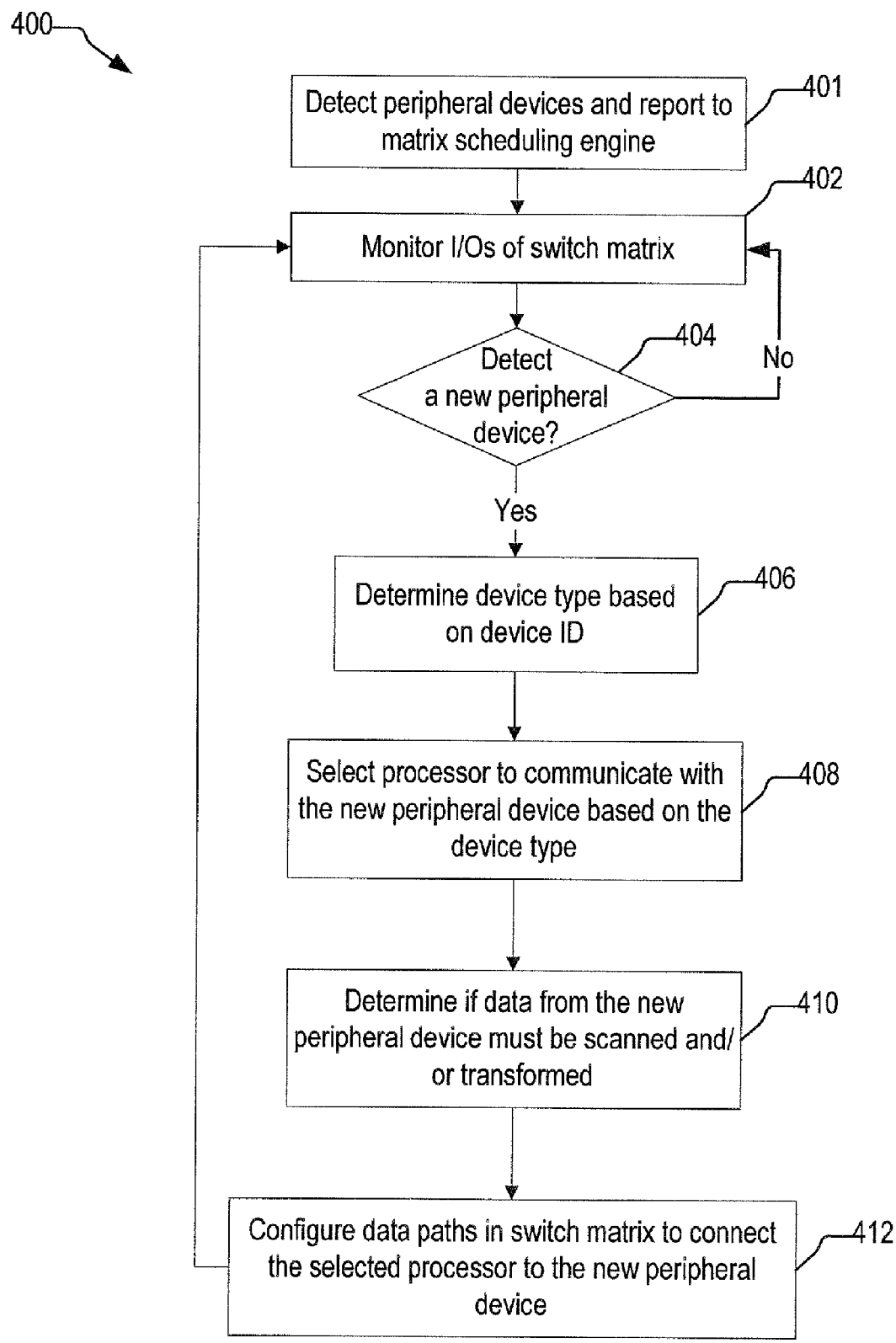
FIG. 4 is a flow chart of a method performed by a media interface switch engine of FIG. 2 in one or more embodiments of the present disclosure.

FIG. 4 is a flow chart of a method 400 implemented by MIS engine 212 in one or more embodiments of the present disclosure. Method 400 includes actions 402, 404, 406, 408, 410, and 412. As previously discussed, a primary version of MIS engine 212 runs on first OS 202 and a backup version of the MIS engine on second OS 204 takes over when the primary version fails.

In action 401, MIS engine 212 detects peripheral devices 110 that are present during power up or initialization and reports them to matrix scheduling engine 210. Whenever system 100 powers up or initializes, switch matrix 112 connects peripheral devices 110 to first processor 102 by default. Action 401 is followed by action 402.

In action 402, MIS engine 212 monitors the states of the inputs/outputs (I/Os) of switch matrix 112. Action 402 is followed by action 404.

In action 404, MIS engine 212 determines if a new peripheral device is present at an I/O of switch matrix 112 based on the states of the I/Os. Switch matrix 112 connects any new peripheral device to first processor 102 by default. For example, the user may plug in a new USB thumb drive to USB interface 110-14 of switch matrix 112. When MIS engine 212 detects the presences of a new peripheral device, action 404 is followed by action 406. Otherwise action 404 loops back to action 402.

In action 406, MIS engine 212 determines the device type based on the device ID provided by the new peripheral device. MIS engine 212 references a database of device IDs and corresponding device types to determine the device type of the new peripheral device. Action 406 is followed by action 408.

In action 408, MIS engine 212 selects one of processors 102 and 104 to communicate with the new peripheral device based on its device type. MIS engine 212 references a database of device types and corresponding processors to determine the processor to communicate with the new peripheral device. The selected processor has the appropriate driver for the new peripheral device. MIS engine also cause the selected processor to load the appropriate driver for the device. Action 408 is followed by action 410.

In action 410, MIS engine 212 determines if the data from the new peripheral device should be further processed. Depending on the device type, the data from the new peripheral device may be scanned by security engine 207 for threats, transformed by translator 122 to be compatible with the selected processor, or both. MIS engine 212 references a database of device types and processing conditions to determine if the data must be further processed. Action 410 is followed by action 412.

In action 412, MIS engine 212 configures the data paths in switch matrix 112 to connect the selected processor and the new peripheral device. When the data from the new peripheral device must be scanned for threats, MIS engine 212 configures the data path in switch matrix 112 to route the data through security engine 207 on first processor 102. When the data from the new peripheral device must be transformed, MIS engine 212 configures the data path in switch matrix 112 to route the data through translator 122 in switch matrix 112. MIS engine 212 also informs matrix scheduling engine 210 of peripheral devices 110 and the configured data paths. Action 412 is followed by action 402.

In one or more embodiments of the present disclosure, MIS engine 212 includes a state reader that implements action 402, a device manager that implements action 404, and a state controller that implements actions 406, 408, 410, and 412. State controller of MIS engine 212 instructs a command processor in switch matrix 112 to configure the data paths as appropriate to connect the selected processor and the new peripheral device and through the security engine and the translator, if necessary.

Figure 5:
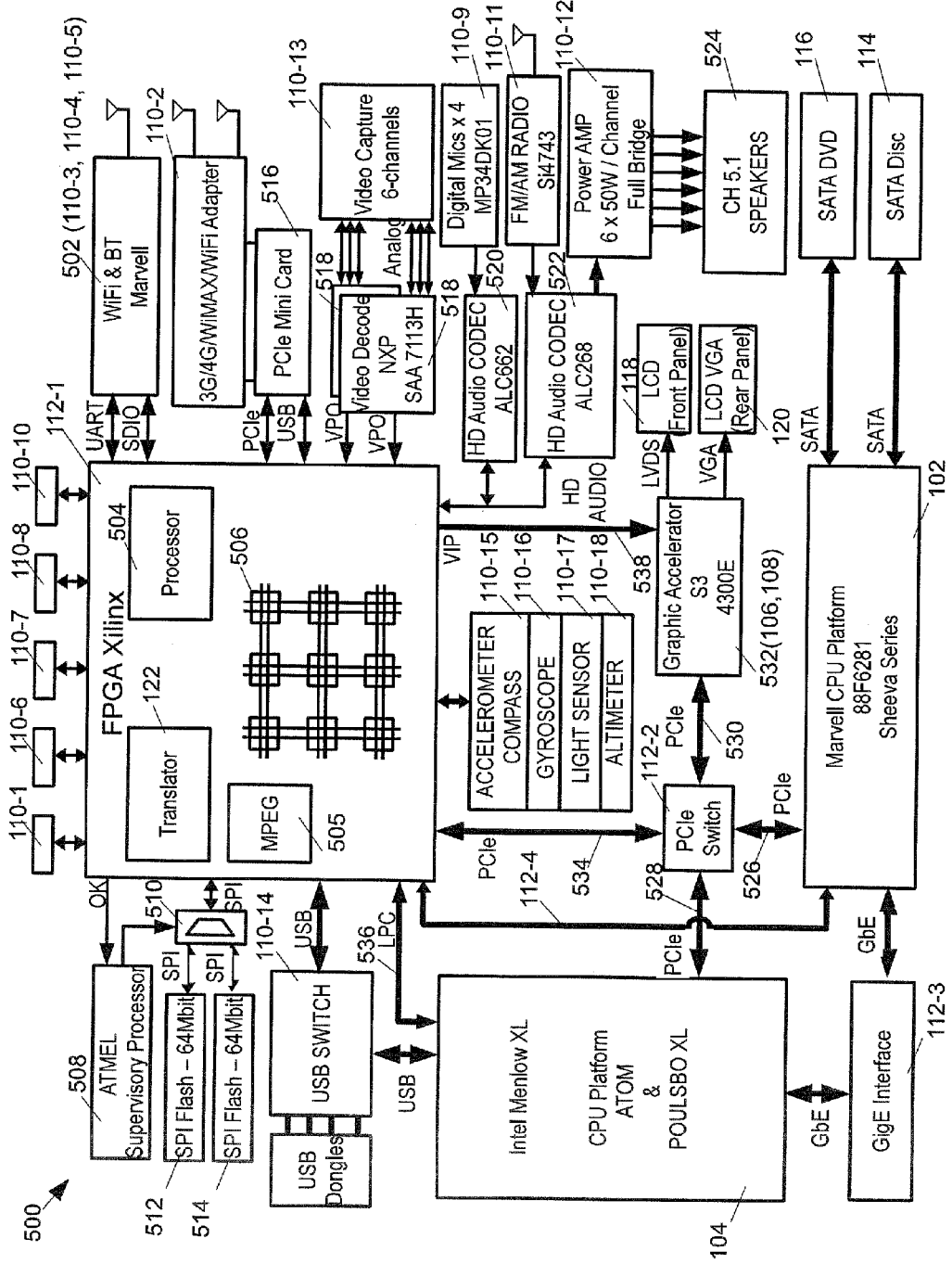
FIGS. 5A and 5B form a block diagram of a hardware implementation of the system of FIG. 1 in one or more embodiments of the present disclosure.

FIGS. 5A and 5B form a block diagram of a hardware implementation of system 100 (hereafter referred to as "system 500") in one or more embodiments of the present disclosure. In system 500, switch matrix 112 is implemented with a field programmable gate array (FPGA) 112-1, a switch 112-2, a link 112-3, and a link 112-4. Switch 112-2 may be a PCI Express (PCIe) switch between first processor 102, second processor 104, and a graphics accelerator card 532. Link 112-3 may be a Gigabit Ethernet (GbE) link between processors 102 and 104. Link 112-4 may be a secure digital input output (SDIO) link between FPGA 112-1 and first processor 102. Alternatively switch matrix 112 may be implemented as an application-specific integrated circuit (ASIC).

In one or more embodiments, a wireless transceiver 502 implements WiFi access point transceiver 110-3, WiFi client transceiver 110-4, and Bluetooth transceiver 110-5.

FPGA 112-1 have I/O blocks (not shown) connected to peripheral devices 110. FPGA 112-1 includes configurable logic blocks (not shown) and programmable interconnects 506 that are configured to route data between peripheral devices 110 and first processor 102, which is linked to FPGA 112-1 through link 112-4. The configurable logic blocks and the programmable interconnects 506 may also be programmed to form a soft FPGA processor 504, an MPEG (moving picture experts group) encoder 505, and translator 122. Alternatively FPGA processor 504 may be a processor chip included in FPGA 112-1.

On power up or initialization, FPGA processor 504 configures FPGA 112-1 to provide default data paths between peripheral devices 110 and first processor 102. On power up or initialization, FPGA processor 504 also configures switch 112-2 to provide default data paths between first processor 102 and graphics accelerator card 532. When a new peripheral device 110 is connected, FPGA processor 504 configures FPGA 112-1 or USB switch 110-14 to provide a default data path between the new peripheral device 100 and first processor 102. FPGA processor 504 may later reconfigure the data paths in response to matrix scheduling engine 210 and MIS engine 212. FPGA processor 504 monitors the health of processors 102 and 204, and informs one processor when the other processor is down. FPGA processor 504 may also monitor the health of peripheral devices 110 and reinitiate the software or the hardware of a failed peripheral device 110.

MPEG encoder 505 may compress videos into a MPEG format before they are written to HDD/SSD 114 or optical disk drive 116. Alternatively, MPEG encoder 505 may be implemented on first processor 102 or second processor 104 instead of FPGA 112-1. As previously discussed, translator 122 reformats the data between communicating components (e.g., between a peripheral device and a processor). FPGA 112-1 also includes programmable interconnects 506 and I/O blocks that route data Supervisor processor 508 is provided to cause a multiplexor 510 to connect one of nonvolatile memories 512 and 514 to FPGA 112-1 when system 500 powers up or initializes. Supervisor processor 508 may be an ATMEL ATtiny24A processor. As will be described later, nonvolatile memories 512 and 514 respectively store primary and factory images of codes for FPGA 112-1, first processor 102, and second processor 104. Only the primary image of the codes may be updated so that the factory image is always available to restore system 500 back to its original condition. Nonvolatile memories 512 and 514 may be serial peripheral interface (SPI) flash memories.

USB/iPod interface 110-14 is connected to FPGA 112-1 and second processor 104. Depending on the device type, MIS engine 212 may route the data from a device connected to USB/iPod interface 110-14 to first processor 102 through FPGA 112-1 or to second processor 104.

Broadband transceiver 110-2 may be connected to a PCIe mini card slot 516, which in turn is connected to the I/O blocks of FGPA 112-1. Cameras 110-13 may be connected to video input processors 518, which are in turn connected to the I/O blocks of FPGA 112-1. Microphones 110-9 may be connected to an audio codec 520, which in turn is connected to the I/O blocks of FGPA 112-1. Audio codec 520 transforms analog audio signals from microphones 110-9 to digital audio signals. Radio receiver 110-11 and power amplifier 110-12 may be connected to a 5.1 channel audio codec 522, which in turn is connected to the I/O blocks of FPGA 112-1. Audio codec 522 transforms analog audio signals from radio receiver 110-11 to digital audio signals. Audio code 522 also decodes a digital audio signal to extract 5.1 channels of analog audio signals for power amplifier 110-12. Power amplifier 110-12 may be connected to drive speakers 524.

Switch 112-2 is respectively connected by links 526, 528, and 530 to first processor 102, second processor 104, and graphics accelerator card 532. Graphics accelerator card 532 includes GPUs 106 and 108, which are respectively connected to displays 118 and 120. FPGA 112-1 sends routing commands from matrix scheduling engine 210 and MIS engine 212 on processors 102 and 104 to switch 112-1 through a link 534. Link 534 may be an I2C (inter-integrated circuit) link.

FGPA 112-1 is connected by a link 536 to second processor 104. FPGA 112-1 sends the BIOS of second processor 104 from one of nonvolatile memories 512 to 514 to the second processor through link 536. FPGA 112-1 may also send other low speed data to second processor 104 over link 536. For example, second processor 104 may communicate with peripheral devices 110 connected to FPGA 112-1 over link 536 when first processor 102 fails. Link 536 may be a low pin count (LPC) link.

FPGA 112-1 is connected by link 538 to graphics accelerator card 532. FPGA 112-1 sends audio/visual data from cameras 110-3 to GPUs 106 and 108 through link 538. Link 538 may be a video interface port (VIP) link.

Link 112-3 connects processors 102 and 104, which provides a direct link between the processors. First processor 102 is connected to HDD/SSD 114 and optical disk drive 116.

For applications on second processor 104 that need data from one of the peripheral devices 110, the data can travel from the peripheral device to FPGA 112-1, from the FPGA to first processor 102 through link 112-4, from the first processor to the second processor through link 112-3. The order may be reversed for sending data to the peripheral device. The data may be processed by translator 122 in FPGA 112-1 and security engine 207 on first processor 102. Alternatively, the data can travel from peripheral device 110 to FPGA 112-1, and from the FPGA to second processor 104 through link 536 when first processor 102 fails.

For applications that need data from HDD/SSD 114 or optical disk drive 116, such as the multimedia player, the data can travel from the HDD/SSD or the optical disk drive to first processor 102, and then from the first processor to second processor 104 through link 112-3. The order is reversed for sending data to the peripheral device. The data can also travel from HDD/SSD 114 or optical disk drive 116 to first processor 102, from the first processor to switch 112-2 through link 526, and the switch can route the data to second processor 104 through link 528. The data may be processed by translator 122 in FPGA 112-1 and security engine 207 on first processor 102.

For processors 102 and 104 to send data to GPUs 106 and 108 in graphics accelerator card 532, the processors send the data to switch 112-2, and the switch routes the data to the graphics accelerator card through link 530.

In one or more embodiments, switch matrix 112 routes audio and visual data from any source in system 100 to automotive bus interface 110-6 for playback using an existing audio and visual system in the vehicle (e.g., existing displays, audio amplifiers, and speakers). For example, visual data processed by graphics accelerator card 532 is routed to switch 112-2, which then routes the visual data to first processor 102. First processor 102 sends the visual data to FPGA 112-1, and the FPGA routes the visual data to automotive bus interface 110-6. Any audio data processed by first processor 102 is routed to FPGA 112-1. Any audio data processed by second processor 104 is routed to first processor 102, which then sends the audio data over link 112-4 to FPGA 112-1. Any audio data processed by a peripheral device 110, such as radio 110-11, is routed to FPGA 112-1. FPGA 112-1 then routes any of these audio data to automotive bus interface 110-6 for playback using an existing audio and visual system in the vehicle.

Figure 6:
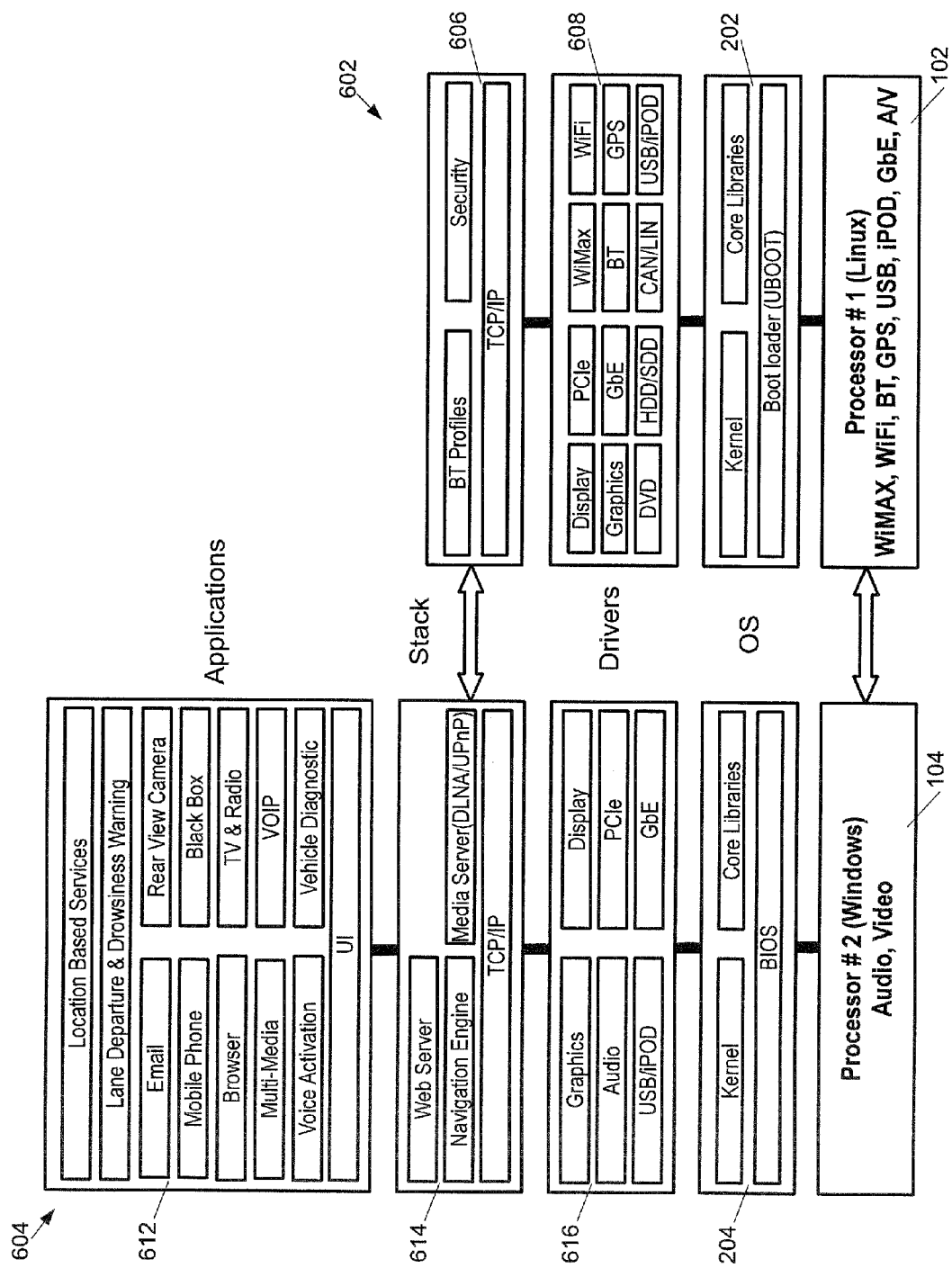
FIG. 6 is a block diagram illustrating software portioning between processors in the system of FIGS. 5A and 5B in one or more embodiments of the present disclosure.

FIG. 6 is a block diagram illustrating software portioning between processors 102 and 104 in one or more embodiments of the present disclosure. The right column includes the software 602 executed by first processor 102 to implement the primary networking functions while the left column includes the software 604 executed by second processor 104 to implement the primary application functions.

Software 602 includes a protocol stack 606, drivers 608, and first OS 202. Protocol stack 606 includes Bluetooth profiles, security engine 207, and the TCP/IP suite. Drivers 608 are provided for GPS receiver 110-1, broadband transceiver 110-2, WiFi AP transceiver 110-3, WiFi client transceiver 110-4, Bluetooth transceiver 110-5, automotive bus interface 110-6, USB/iPod interface 119-14, displays 118 and 120, PCIe, GPUs 106 and 108, GbE link, HDD/SSD 114, and optical disk drive 116. First OS 202 includes kernels, core libraries, and a boot loader.

Software 604 includes applications 612, protocol stack 614, drivers 616, and second OS 204. As described previously, applications 612 include a UI application, a browser application, an email application, a mutimedia player, a vehicle diagnostic application, a mobile phone application, a location based service applications, a TV application, a radio application, a VoIP application, a rearview camera application, a lane departure warning application, a drowsiness warning application, a blackbox application, and a voice command application.

Protocol stack 614 includes a web server, a navigation engine, a media server, and the TCP/IP suite. Web server is used by the browser application to surf the Internet. The navigation engine is used by the local based service applications to access GPS information. The media server is used by the multimedia player to access media from HDD/SSD 114, optical disk drive 116, the Internet, and any peripheral device. Drivers 616 are provided for GPUs 106 and 108, displays 118 and 120, power amplifier 110-12, PCIe, and USB/iPod interface 119-14. Second OS 204 includes kernels, core libraries, and basic input/output system (BIOS).

Figure 7:
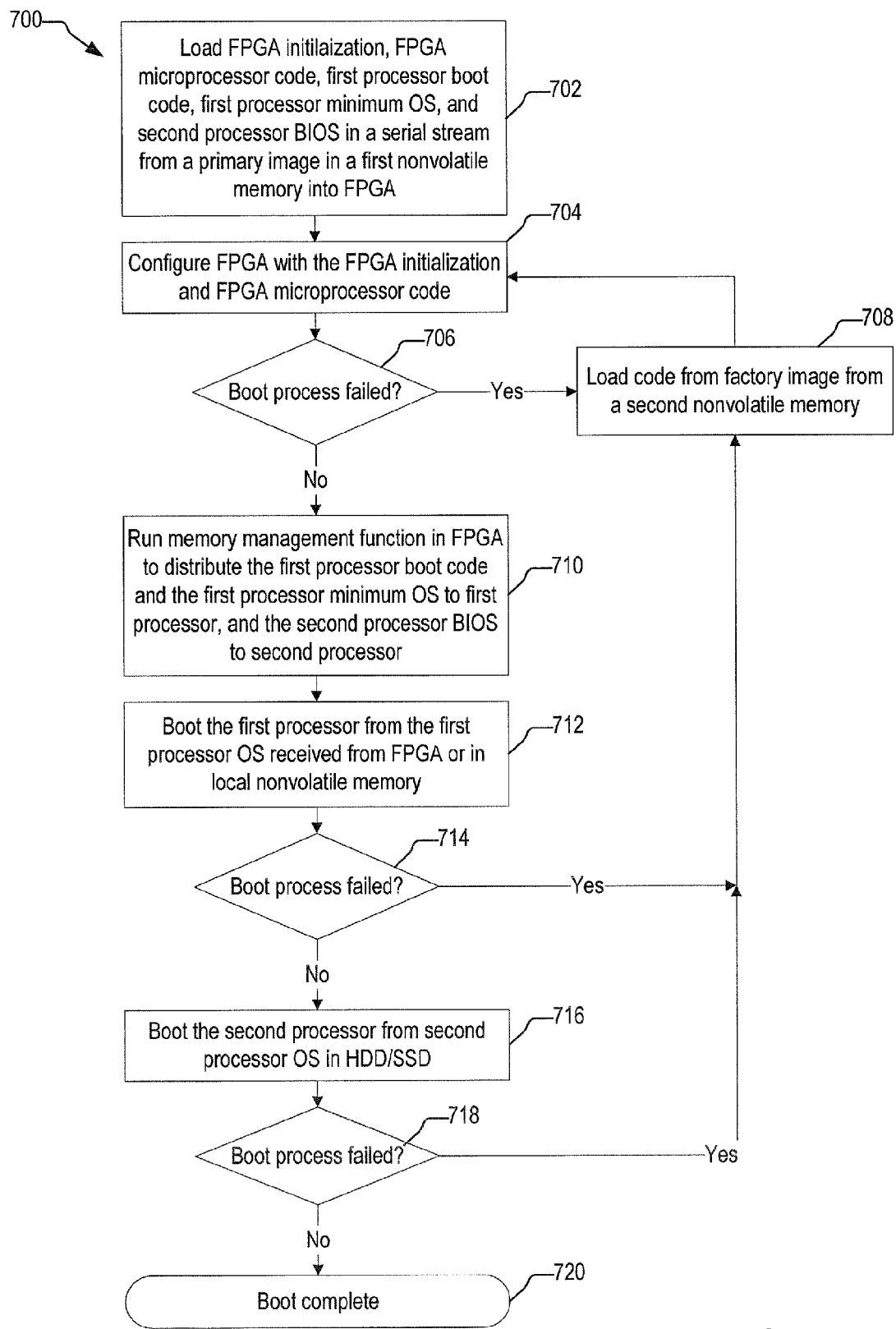
FIG. 7 illustrates a boot up method of the system of FIGS. 5A and 5B in one or more embodiments of the present disclosure.

FIG. 7 illustrates a boot up method 700 of system 500 in one or more embodiments of the present disclosure. Method 700 includes actions 702, 704, 706, 708, 710, 712, 714, 716, 718, and 720.

In action 702, supervisory processor 508 causes multiplexer 510 to select nonvolatile memory 512 to load a primary image of codes to FPGA 112-1. The codes include FPGA initialization parameters, FPGA microprocessor code, a boot code for first processor 102, a minimum version of first OS 202, and a BIOS for second processor 104. The codes are loaded in a serial stream to FPGA 112-1. Action 702 is followed by action 704.

In action 704, FPGA 112-1 is configured with the FPGA initialization parameters and the FPGA microprocessor code to provide the necessary connections between processors 102 and 104 and peripheral devices 110. Action 704 is followed by action 706.

In action 706, supervisory processor 508 determines if the boot process has failed at this point. The boot process has failed at this point if FPGA 112-1 has failed to be configured. If the boot process has failed, action 706 is followed by action 708. Otherwise action 706 is followed by action 710.

In action 708, supervisory processor 508 causes multiplexer 510 to select nonvolatile memory 514 to load a factory image of the codes to FPGA 112-1. The factory image of the codes should allow system 500 to boot up without any error. Action 708 is followed by action 704 to repeat the boot process.

In action 710, FPGA processor 504 executes a memory management function to distribute the boot code for first processor 102 and the minimum version of first OS 202 to the first processor over link 112-4, and the BIOS for second processor 104 to the second processor over link 536. As the codes were received in a serial stream, the memory management function is programmed with the lengths of the codes so they may be parsed from the serial stream and routed to the appropriate recipient. Action 710 is followed by action 712.

In action 712, first processor 102 starts to boot up using its boot code. First processor 102 may boot off the minimum version of first OS 202 or an updated version of first OS 202 saved in a local nonvolatile memory. Action 712 is followed by action 714.

In action 714, FPGA processor 504 determines if the boot process has failed at this point. The boot process has failed at this point if first processor 102 has failed to boot up. If the boot process has failed, action 714 is followed by action 708. Otherwise action 714 is followed by action 716.

In action 716, second processor 104 starts to boot up using its BIOS. Second OS 204 is stored in HDD/SSD 114. As part of the boot up process, second processor 104 requests first processor 102 for second OS 204. Action 716 is followed by action 718.

In action 718, FPGA processor 504 determines if the boot process has failed at this point. The boot process has failed at this point if second processor 104 has failed to boot up. If the boot process has failed, action 718 is followed by action 708. Otherwise action 718 is followed by action 720 where the boot process completes.

Note that the memory management function also allows the FPGA processor to update any code in the primary image in the field separate from the other codes as it knows the lengths of the codes. For example, first processor 102 may download an updated BIOS for second processor 104 and the FPGA processor may use the memory management function to overwrite only the BIOS code in the primary image instead of the entire code in the primary image.

Various other adaptations and combinations of features of the embodiments disclosed are within the scope of the present disclosure. For example, the roles of processors 102 and 104 may be reversed so switch matrix 112 connects GPUs 106 and 108 and peripheral devices 110 to second processor 104 by default on power up or initialization, and later matrix scheduling engine 210 and MIS engine 212 may reconfigure the data paths in switch matrix 112. Numerous embodiments are encompassed by the following claims.

What is claimed is:

1. A system, comprising:
   a first processor;
   a second processor;
   a first graphics processing unit for generating a first video signal;
   a second graphics processing unit for generating a second video signal;
   one or more peripheral devices;
   a switch matrix coupled to the first processor, the second processor, the first graphics processing unit, the second graphics processing unit, and the peripheral devices, wherein the switch matrix comprises programmable data paths between the processors, the graphics processing units, and the peripheral devices;
   processor-readable memory; and
   software encoded in the processor-readable memory, comprising:
   a first operating system (OS) executed by the first processor;
   a second OS executed by the second processor, wherein the first OS has a faster boot time than the second OS and the first processor has a faster boot time than the second processor;
   when the processors are booting UP, the switch matrix configures the data to couple the first processor and the graphics processing units so the first processor initially controls the graphics processing units;
   when the second processor has booted up, the matrix scheduling engine configures the data paths in the switch matrix to couple the second processor and the graphics processing units so the second processor takes control of the graphics processing units from the first processor;
   a matrix scheduling engine running on the operating systems, wherein the matrix scheduling engine configures the data paths in the switch matrix to couple the processors and the graphics processing units, to couple the processors and the peripheral devices, and when the second processor fails, configuring the data paths in the switch matrix to couple the first processor and the graphics processing units so the first processor takes control of the graphics processing units from the second processor; and
   a media interface switch engine running on the operating systems, wherein the media interface switch engine detects presence of the peripheral devices and configures the data paths in the switch matrix to couple the processors and the peripheral devices.

2. The system of claim 1, wherein the matrix scheduling engine further performs the following:
   when the second processor fails, configuring the data paths in the switch matrix to couple the first processor and one or more of the peripheral devices.

3. The system of claim 1, wherein the matrix scheduling engine performs the following:

to distribute workload between the processors, configuring the data paths in the switch matrix to couple the first processor and the second graphics processing unit, and to couple the second processor and the first graphics processing unit.

4. The system of claim 1, wherein the matrix scheduling engine further performs the following:
when the first processor fails, configuring the data paths in the switch matrix to couple the second processor and one or more of the peripheral devices.

5. The system of claim 1, wherein the media interface switch engine performs the following:
monitoring I/Os of the switch matrix for any new peripheral device;
when a new peripheral device is detected:
determining a device ID of the new peripheral device;
based on the device ID, selecting one of the processors to communicate with the new peripheral device; and
based on the selected processor, configuring the data paths in the switch matrix to couple the selected processor and the new peripheral device.

6. The system of claim 5, wherein the switch matrix comprises a translator and the data paths in the switch matrix pass data from the new peripheral device through the translator to transform the data to a format compatible with the selected processor.

7. The system of claim 6, wherein the software further comprises a security engine executed by the first processor and the data paths in the switch matrix pass the data through the first processor for the security engine to scan the data for computer viruses.

8. The system of claim 1, wherein the software further comprises:
first primary software executed by the first processor;
second primary software executed by the second processor;
first backup software executed by the first processor when the second primary software executed by the second processor fail; and
second backup software executed by the second processor when the first primary software executed by the first processor fails.

9. The computer system of claim 8, wherein the first primary software comprises one or more of a Bluetooth driver, a WiFi access point driver, a WiFi client driver, a broadband driver, a GPS driver, and an automotive bus driver.

10. The computer system of claim 9, wherein the second primary software comprises one or more of a user interface application, a browser application, an email application, a multimedia player, a vehicle diagnostic application, a mobile phone application, a navigation application, a radio application, a VoIP application, a rearview camera application, a lane departure warning application, a drowsiness warning application, a blackbox application, and a voice command application.

11. The computer system of claim 10, wherein the peripheral devices include one or more of a Bluetooth transceiver, a WiFi access point transceiver, a WiFi client transceiver, a broadband transceiver, a GPS receiver, one or more video cameras, one or more microphones, a radio receiver, a power amplifier for speakers, a USB switch, a touch screen, an automotive bus interface, an accelerometer, a gyroscope, a light sensor, and an altimeter.

12. The computer system of claim 11, wherein the broadband transceiver includes 3G, 4G, WiMAX, and LTE.

13. The computer system of claim 11, wherein the blackbox application comprising instructions for recording information from the microphones, the video cameras, the GPS receiver, the automotive bus interface, the accelerometer, the gyroscope, and the altimeter.

14. The computer system of claim 1, wherein the peripheral devices includes an automotive bus interface, and the switch matrix routes audio and visual data to the automotive interface bus for playback using an existing audio and visual system in the vehicle.

15. The computer system of claim 1, further comprising one or more of an optical disk player and a hard disk drive coupled to the first processor.

16. The computer system of claim 1, wherein the processors have different instruction set architectures.

17. The computer system of claim 1, further comprising a front display and one or more rear displays, wherein the first graphics processing unit drives the front display and the second graphics processing unit drives the rear displays.

18. The computer system of claim 1, wherein the switch matrix includes:
a PCI Express switch coupled to the processors and the graphics processing units;
a field programmable gate array (FPGA) coupled to the first processor and the plurality of peripheral devices; and
a Gigabit Ethernet link between the processors.

19. The computer system of claim 18, wherein the processor-readable memory comprises:
a first nonvolatile memory storing a primary image of FPGA initialization parameters, FPGA microprocessor code, boot code for the first processor, the first OS, and BIOS for the second processor; and
a second nonvolatile memory storing a factory image of the FPGA initialization parameters, the FPGA microprocessor code, the boot code for the first processor, the first OS, and the BIOS for the second processor.

20. The computer system of claim 19, wherein the FPGA microprocessor code comprises instructions for distributing the boot code for the first processor and the first OS to the first processor, and for distributing the BIOS for the second processor to the second processor.

21. The computer system of claim 1, wherein the switch matrix comprises an application-specific integrated circuit.

* * * * *